United States Patent
Zacche' et al.

(10) Patent No.: US 8,907,538 B2
(45) Date of Patent: Dec. 9, 2014

(54) MOTOR FOR DRIVING A CONTAINER-HOLDER PLATE IN A LABELLING MACHINE

(75) Inventors: Vanni Zacche', Roncoferraro (IT); Antonio Secchi, Campegine (IT)

(73) Assignee: Sidel International AG, Hünenberg (CH)

( * ) Notice: Subject to any disclaimer, the term of this patent is extended or adjusted under 35 U.S.C. 154(b) by 1066 days.

(21) Appl. No.: 11/756,837

(22) Filed: Jun. 1, 2007

(65) Prior Publication Data

US 2008/0000323 A1    Jan. 3, 2008

(30) Foreign Application Priority Data

Jun. 6, 2006 (EP) .................................... 06425385

(51) Int. Cl.
*H02K 7/02* (2006.01)
*H02K 7/08* (2006.01)
*H02K 7/14* (2006.01)
*B65C 9/04* (2006.01)
*H02K 7/00* (2006.01)

(52) U.S. Cl.
CPC .. *H02K 7/14* (2013.01); *B65C 9/04* (2013.01); *H02K 7/003* (2013.01)
USPC ........... 310/90; 310/153; 74/433.5; 74/572.2; 318/150; 318/161

(58) Field of Classification Search
CPC ............ H02K 7/02; H02K 7/08; H02K 7/085
USPC ......... 310/71, 89, 90, 153, 67 R, 74; 74/5.95, 74/433.5, 572.2; 318/150, 161; 29/775
See application file for complete search history.

(56) References Cited

U.S. PATENT DOCUMENTS

| | | | | |
|---|---|---|---|---|
| 3,934,714 A | * | 1/1976 | Matsumoto | 198/379 |
| 4,511,025 A | * | 4/1985 | Nakayama | 198/377.08 |
| 6,707,185 B2 | * | 3/2004 | Akutsu et al. | 310/71 |
| 6,794,779 B2 | * | 9/2004 | Ma et al. | 310/80 |
| 6,914,362 B2 | * | 7/2005 | Lungu | 310/219 |
| 2003/0031114 A1 | * | 2/2003 | Noda et al. | 310/90 |
| 2005/0265881 A1 | * | 12/2005 | Davidson et al. | 418/61.3 |

FOREIGN PATENT DOCUMENTS

| | | |
|---|---|---|
| DE | 29906804 | 7/1999 |
| EP | 1596488 | 11/2005 |

* cited by examiner

*Primary Examiner* — Michael Andrews
(74) *Attorney, Agent, or Firm* — Shoemaker and Mattare

(57) ABSTRACT

A motor for a plate of a labelling machine comprises a housing with a connecting portion for connecting the motor to a carousel of the labelling machine, a motor shaft pivotally supported within the housing, a coupling flange having a first end connected to the motor shaft and a second end that can be connected to the plate. The motor shaft and coupling flange are joined as one piece such as to form a one-body shaft-flange unit.

15 Claims, 9 Drawing Sheets

MOTOR FOR DRIVING A CONTAINER-HOLDER PLATE IN A LABELLING MACHINE

FIELD OF THE INVENTION

Figure 1:
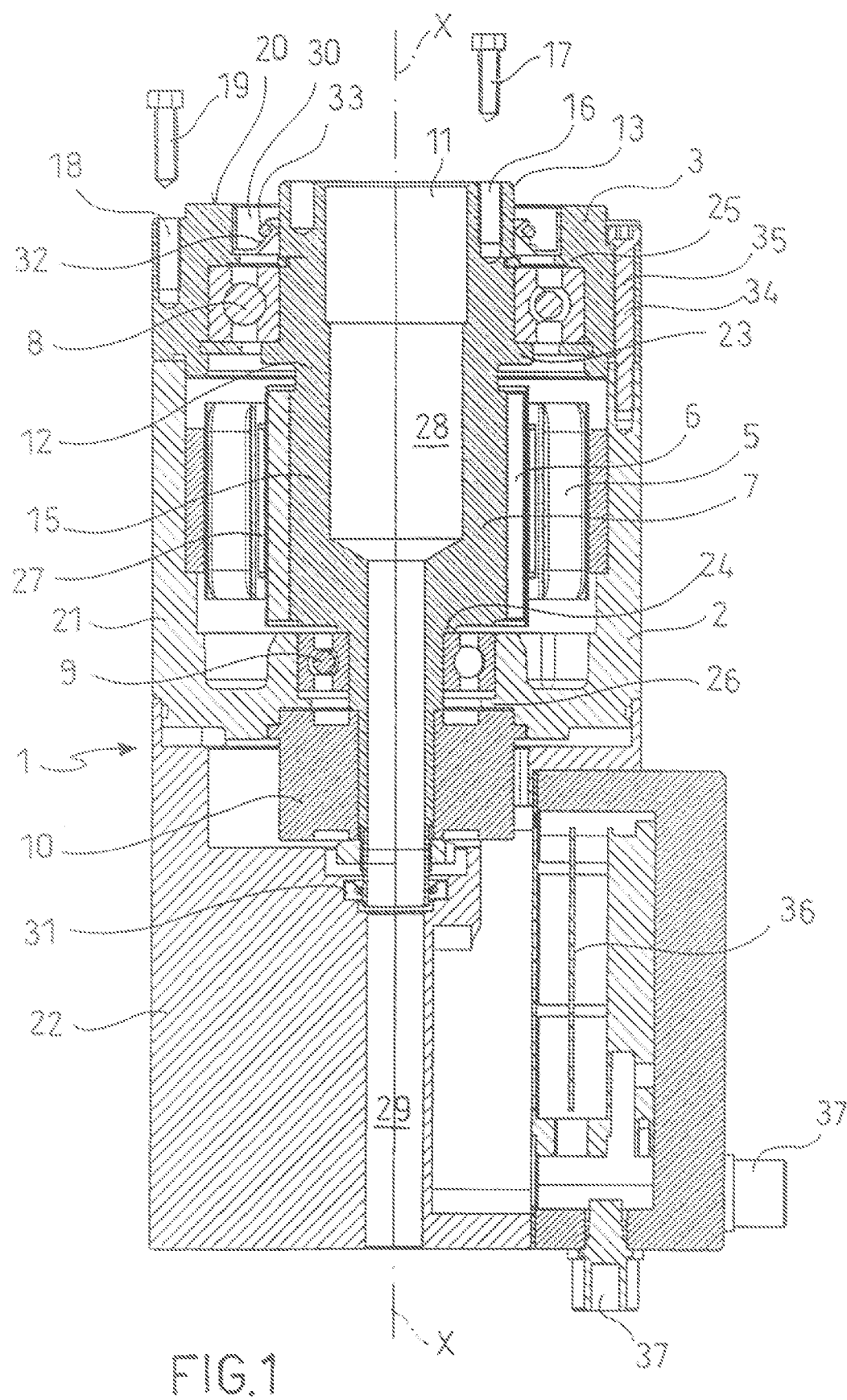

The present invention relates to a motor for driving a container-holder plate in a labelling machine. Particularly, the invention relates to a container-holder plate for a rotary labelling machine of the type comprising a carrousel supporting a plurality of container-holder plates (simply called the "plates", hereinafter) along the periphery thereof, wherein the carrousel can be pivotally driven by a carrousel motor in order to be able to place each individual plate in the carrousel at one or more labelling stations arranged about the carrousel, and wherein a drive motor is associated with each plate, which is suitable to turn the plate about the axis thereof, in order to allow placing the bottle, or generally the container supported by the plate in those angular positions as required to apply the label. The invention further relates to a plate-motor unit for rotary labelling machines, as well as a rotary labelling machine.

BACKGROUND OF THE INVENTION

Electric motors have been proposed for driving the plates, such as direct current, alternate current or three-phase motors. These motors can be of the synchronous, asynchronous or stepping types. These electric motors are integrally connected to the plate by means of a so-called coupling flange, which, by being connected both to the end of the motor shaft and to the plate, or to a plate support to which the actual plate is then connected, provides a (rotatably integral) serial connection between the motor shaft and the plate.

It has been observed that the coupling flange, as it must act as the transitional element between the very small diameter of the motor shaft and the relatively large diameter of the plate, has a certain radial and axial bulk, which is further increased by the connecting members by means of which the coupling flange is connected to the motor shaft. This moves the plate away from the motor, and results in an undesired bulk for the whole motor-plate unit.

In order to resolve the problem of this bulk, it has been suggested, for example in EP 1 596 488 A2, to arrange at least a part of the connecting elements between the motor shaft and the plate within the motor housing and, particularly, to provide the connection between the motor shaft and the coupling flange within the motor housing.

This known solution reduces the distance between motor and plate, but at the same time, the axial and transversal bulk of the motor is increased, thus resulting in an overall bulk of the motor-plate unit which is still considerable.

Furthermore, both the shaft and coupling flange require a precision mechanical processing in the motor bearing areas and in the connecting areas therebetween and each maintenance activity on the connection within the motor requires the motor to be disassembled and this necessarily also involves the motor bearings.

In addition to said disadvantages, all known solutions have a drawback in that the kinematic chain of motor shaft-coupling flange-plate support-plate is undesirably long and thus yielding, because of the clearances occurring in the at least three coupling points.

The object of the present invention is thus to improve the plate motors, such as to reduce the total bulk of the motor-plate unit and increase the rigidity of the transmission of the torsion from the motor to the plate.

A further object of the present invention is to provide a motor for a plate, which does not require any maintenance activity to be carried out on the connection between the motor shaft and the coupling flange.

SUMMARY OF THE INVENTION

This and other objects are achieved by means of a motor for a container-holder plate in a labelling machine, comprising:
a support and containment structure provided with one or more connecting portions for connecting the motor to a carrousel of the labelling machine;
a motor shaft being pivotally supported within said support and containment structure;
a coupling flange having a first end connected to said motor shaft and a second end forming one or more seats for connection to the plate, in which the motor shaft and the coupling flange are fabricated as one piece such as to make a one-body shaft-flange unit 15.

Those skilled in the art will readily appreciate how the thus-configured motor avoids a coupling point (between the motor shaft and the coupling flange), the bulk and the clearances connected to this coupling being thus completely eliminated, and the torque transmission from the motor to the plate is thus stiffened.

As the one-body shaft-flange unit acts both as the motor shaft and coupling flange, this coupling flange can be completely omitted as a distinct component, and the precision processing of the bearing seats can be restrained only to one mechanical component, i.e. the shaft-flange unit 15.

As the coupling flange as a distinct component is avoided, this advantageously allows also avoiding the requirement of connecting this component to the motor shaft and carrying out maintenance activities on this connection.

BRIEF DESCRIPTION OF THE DRAWING FIGURES

Figure 2:
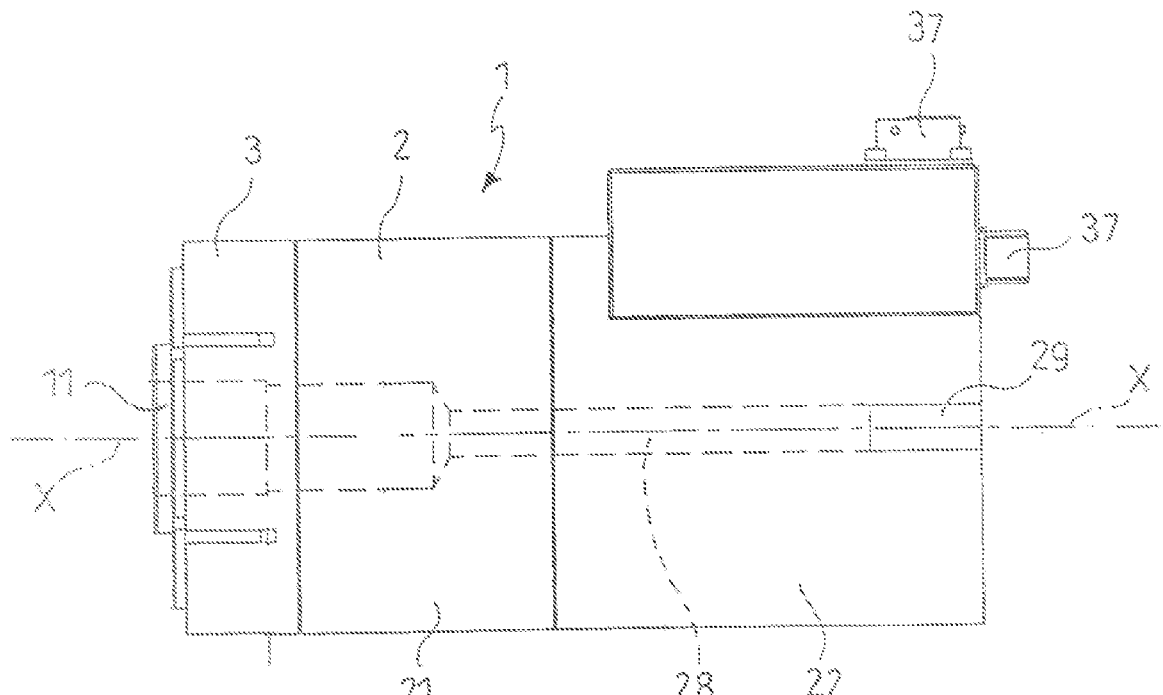
Figure 3:
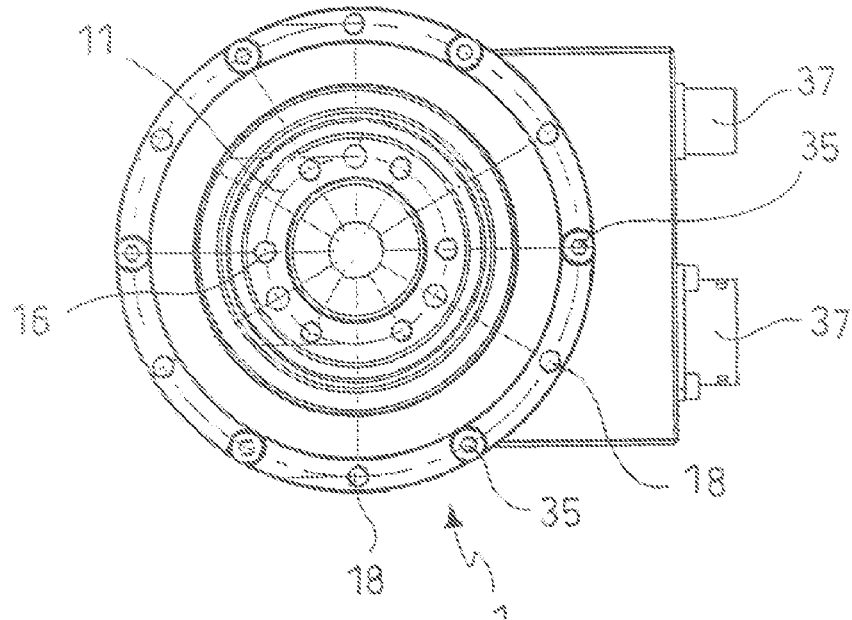
Figure 4:
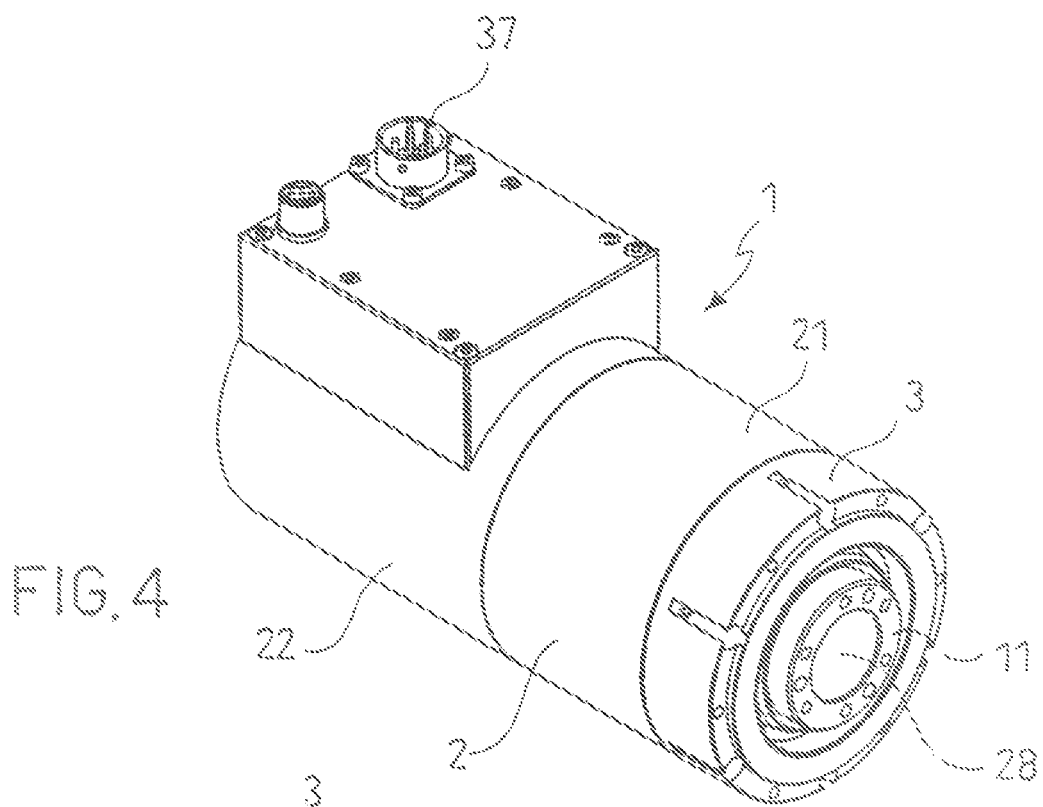
Figure 5:
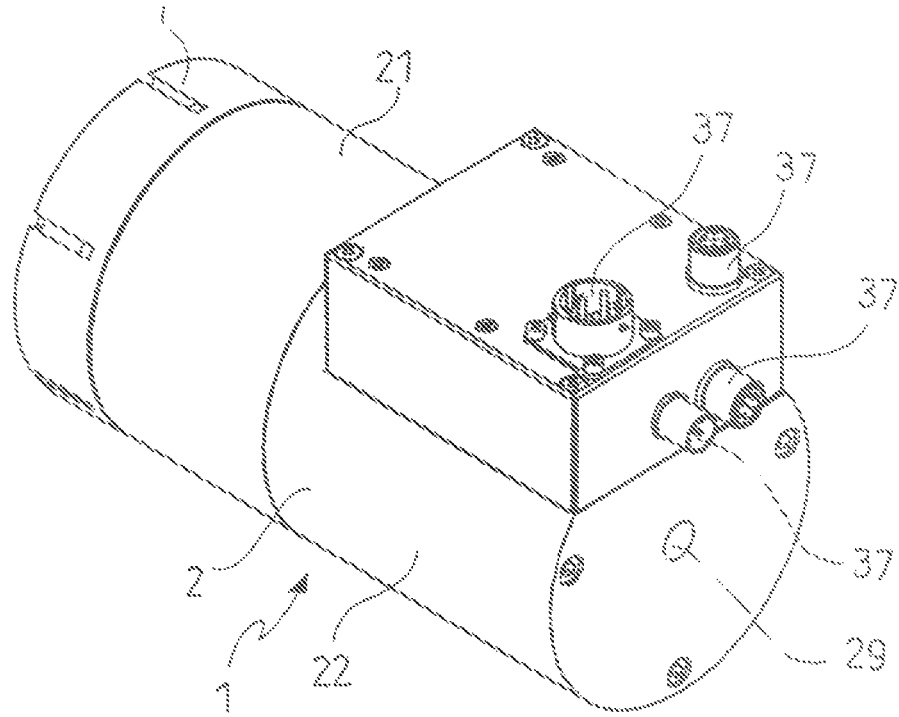
Figure 6:
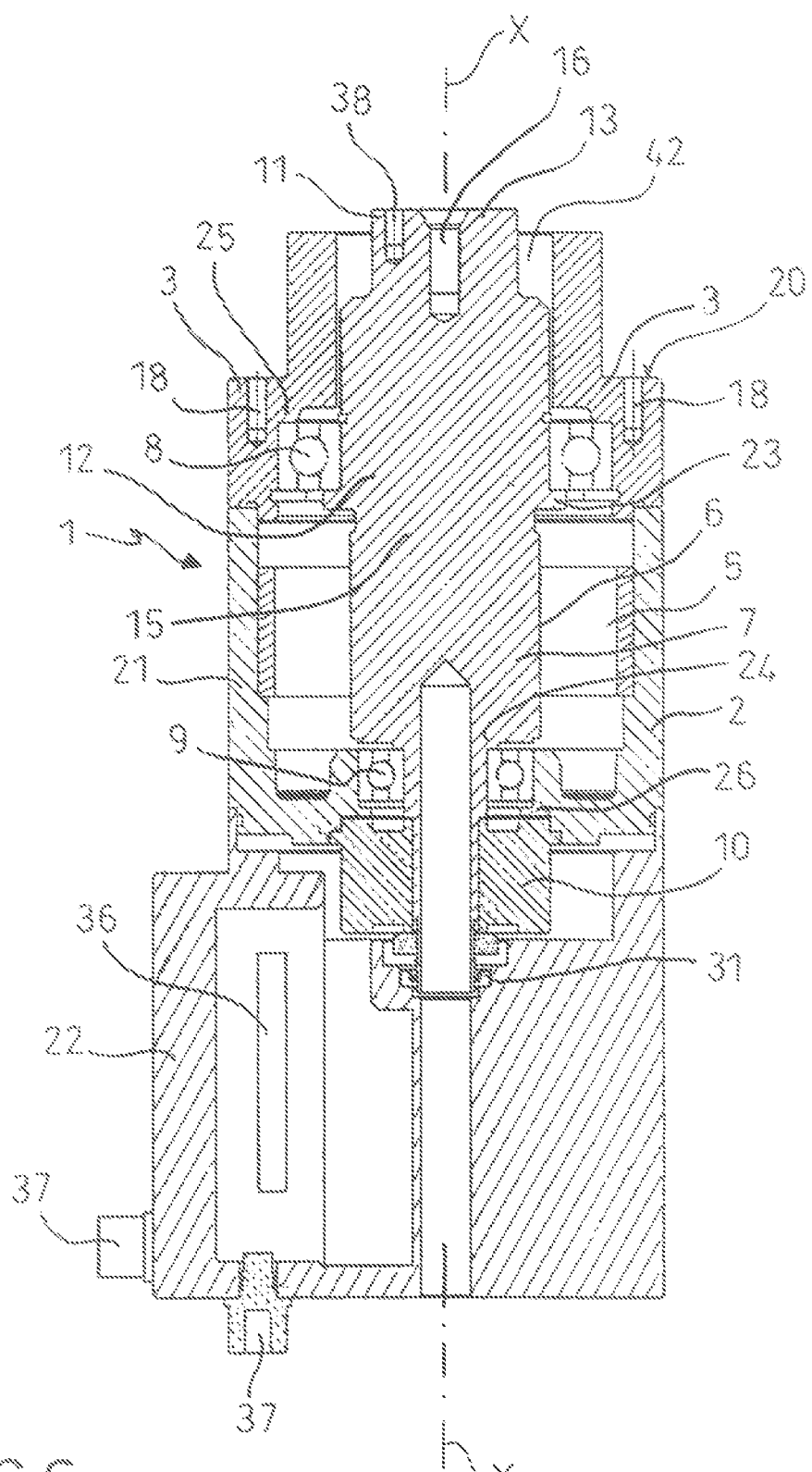
Figure 7:
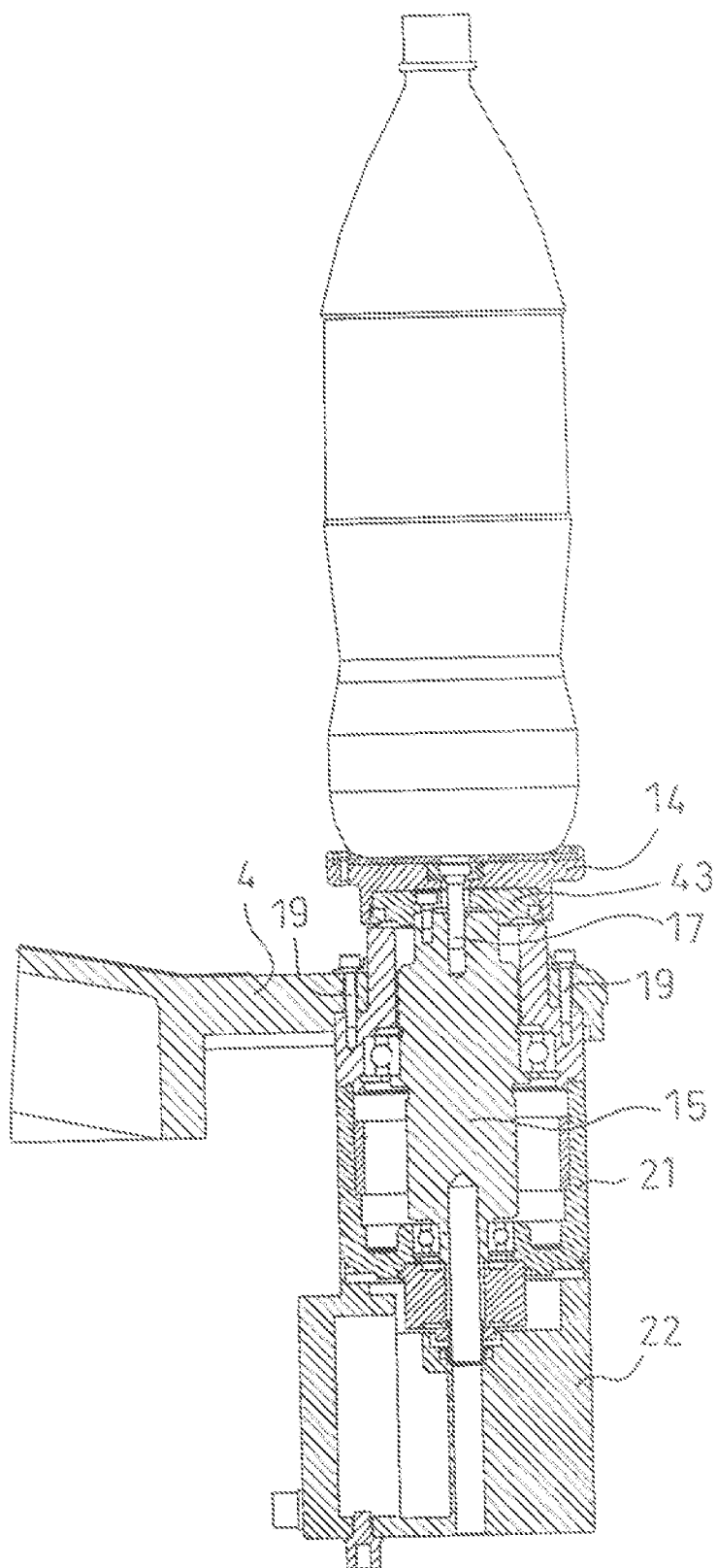
Figure 8:
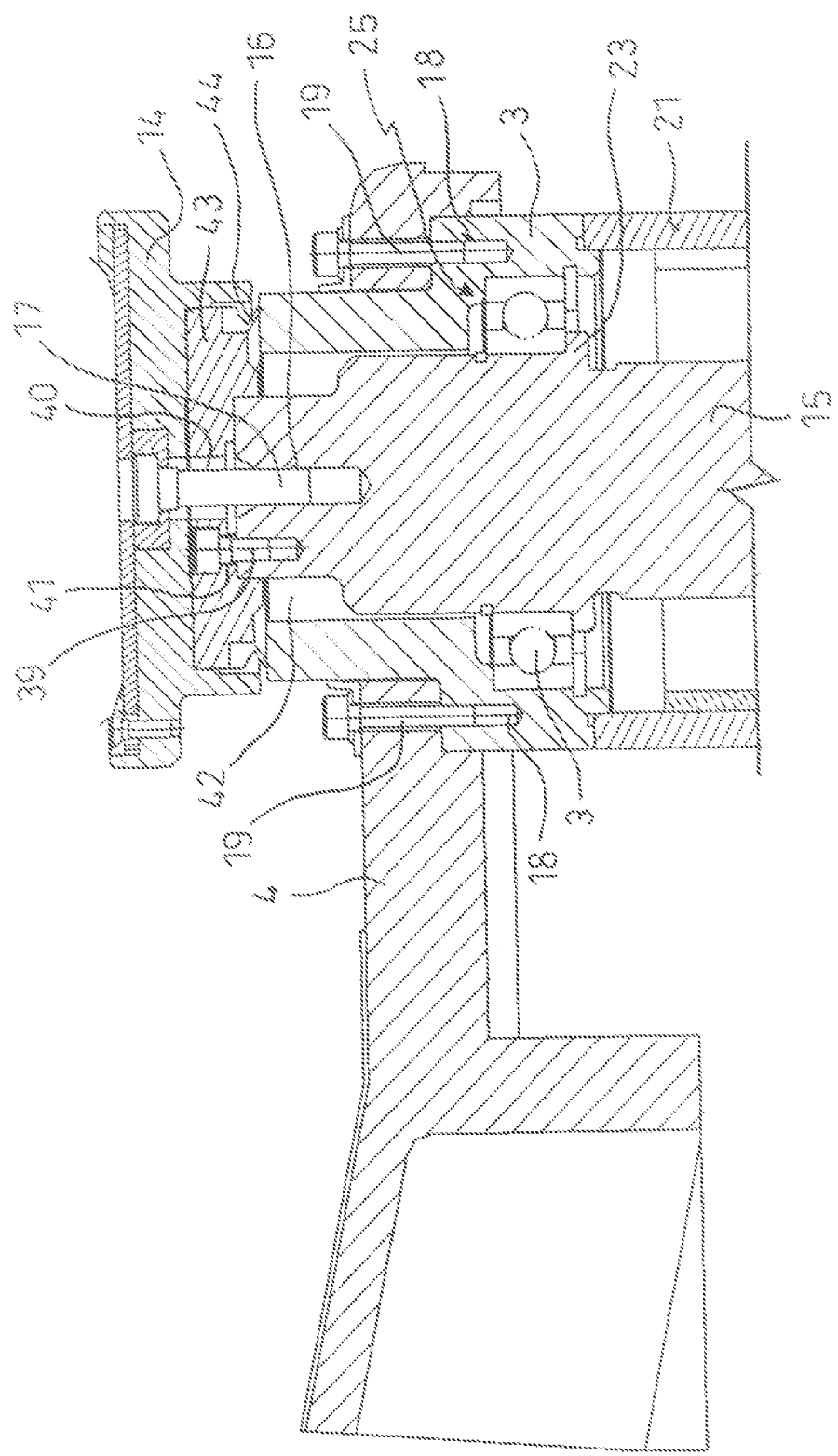
Figure 9:
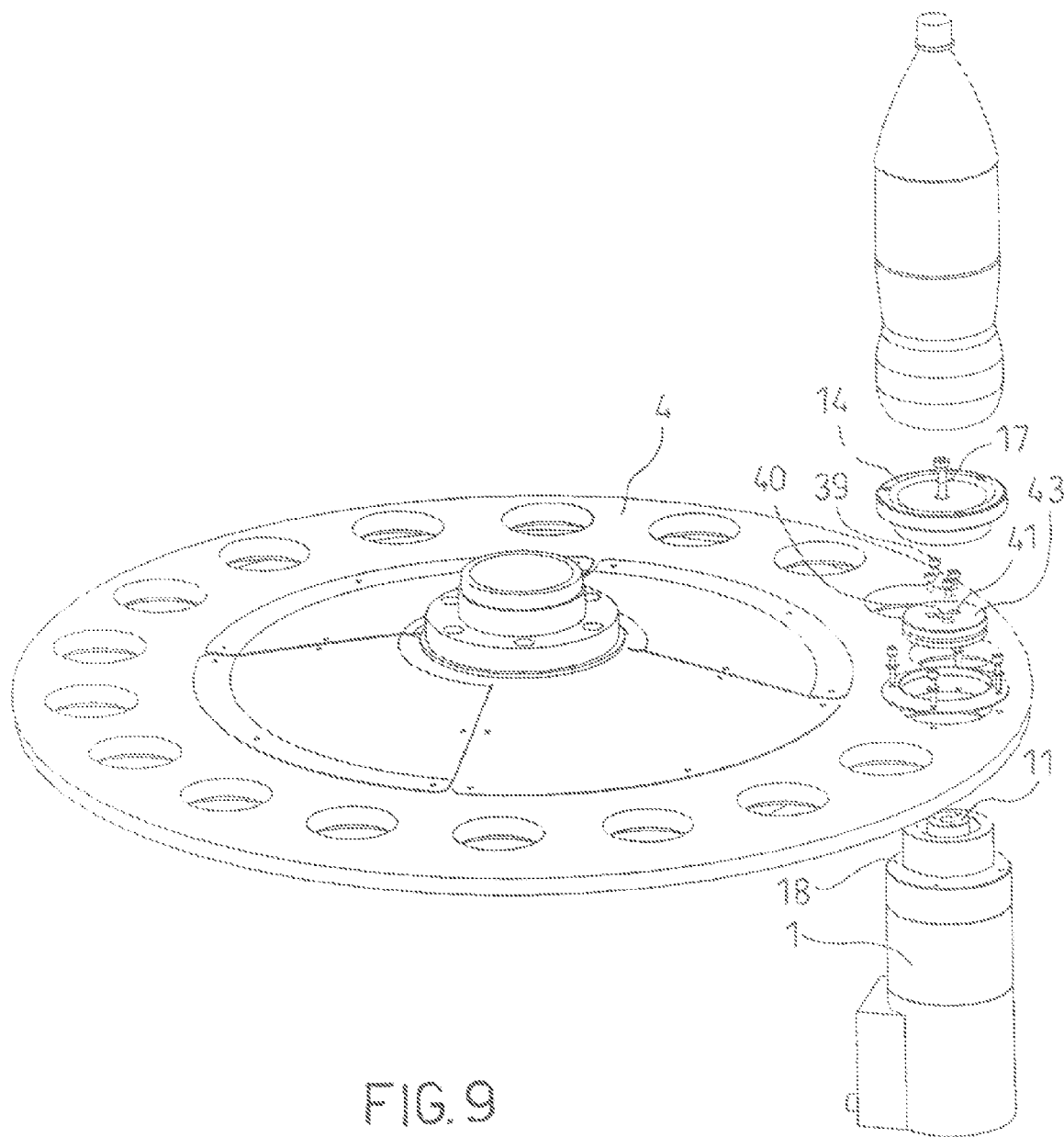
Figure 10:
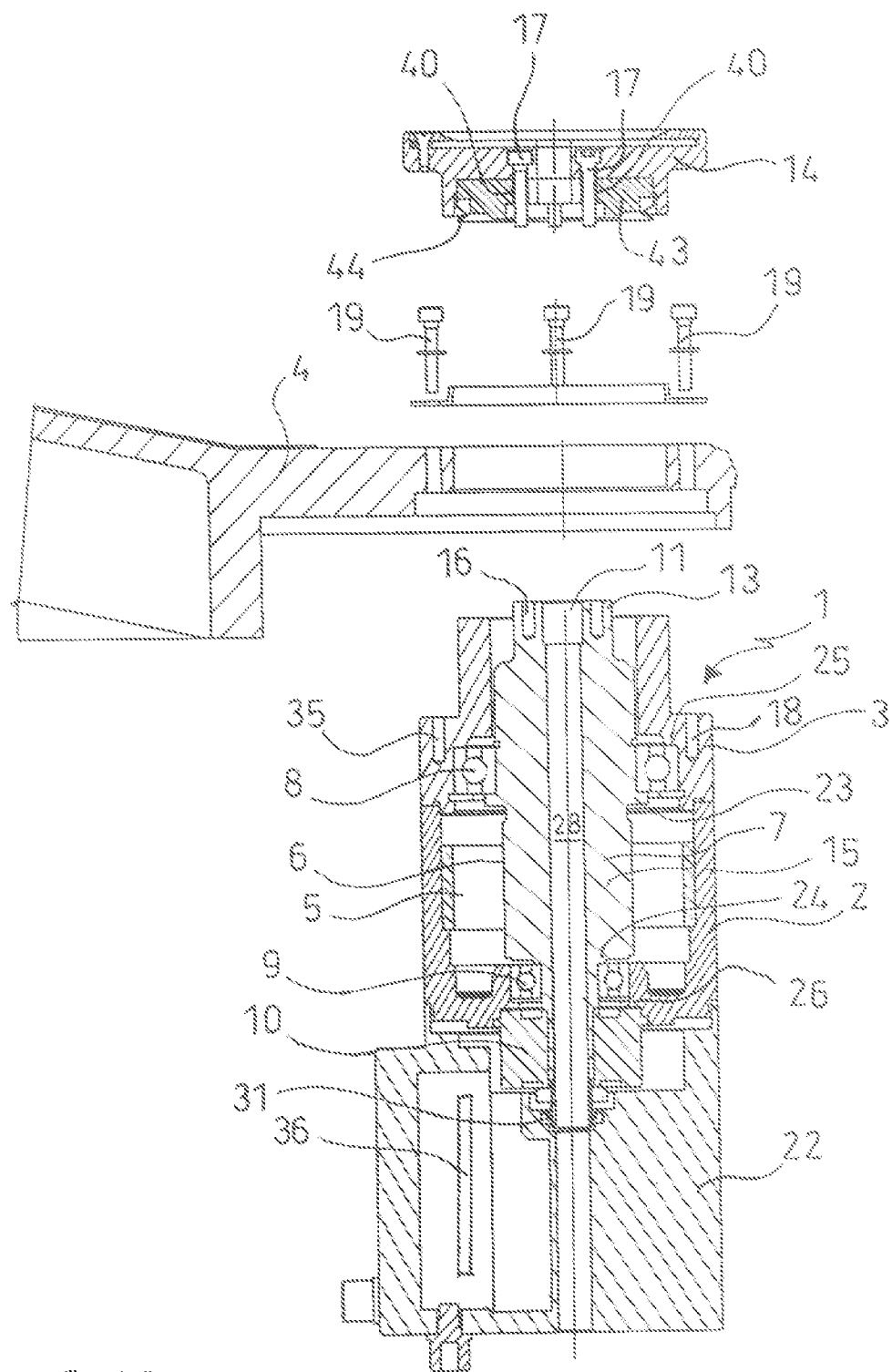
Figure 11:
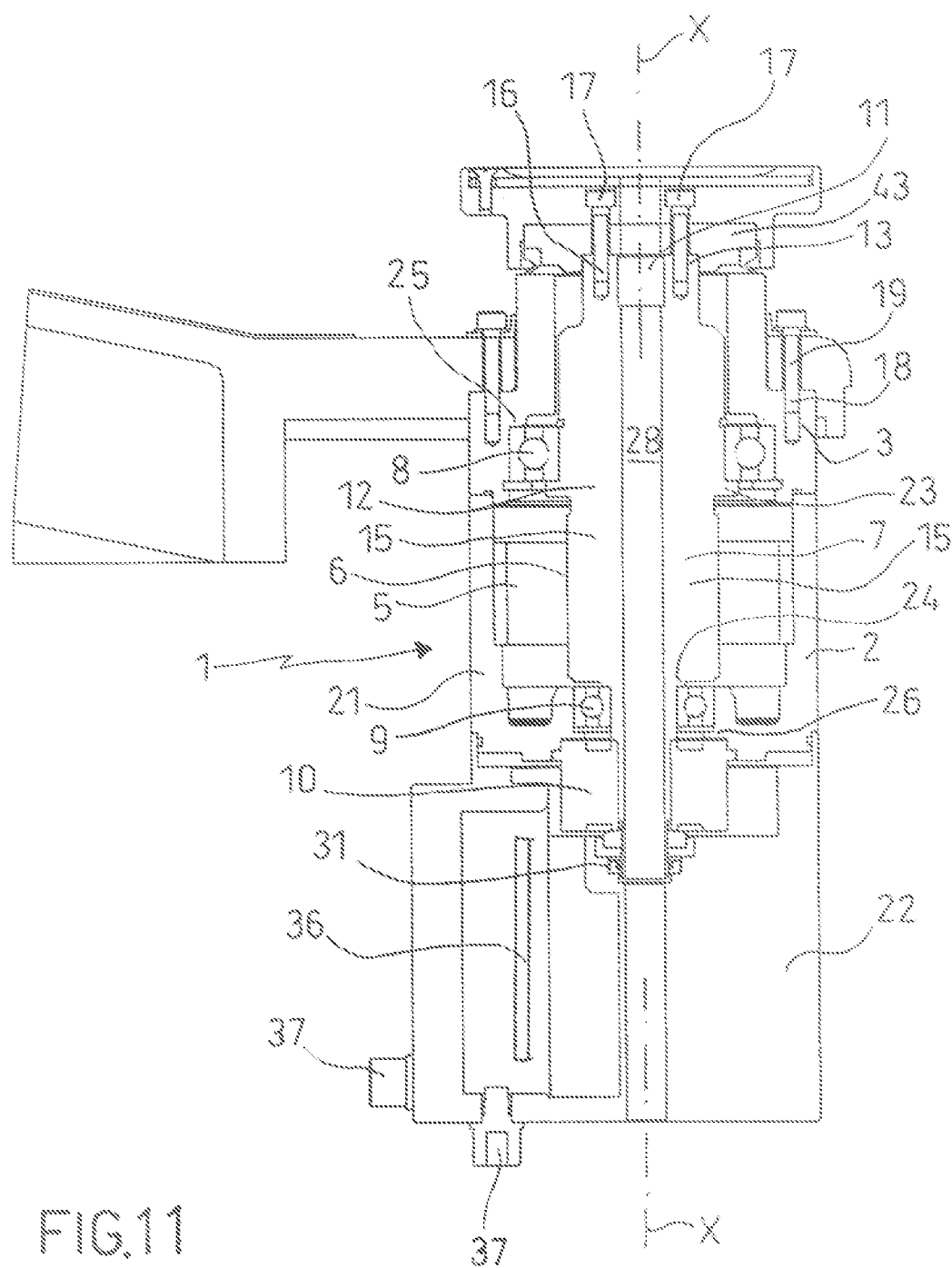

In order to better understand the invention and appreciate the advantages thereof, some exemplary non-limiting embodiments of the same will be described herein below, with reference to the annexed drawings, in which:
FIG. 1 is a longitudinal sectional view of a motor for a plate of a labelling machine according to the invention;
FIG. 2 is a side view of the motor from FIG. 1;
FIG. 3 is a top view of the motor from FIG. 1;
FIGS. 4 and 5 are perspective views of the motor of FIG. 1;
FIG. 6 is a longitudinal sectional view of a motor for a plate according to a further embodiment of the invention;
FIG. 7 is a partial, schematic sectional view of the motor as being mounted on a labelling machine;
FIG. 8 is an enlarged view of a detail from FIG. 7;
FIG. 9 is an exploded perspective view of a carrousel with a plate-motor unit according to the invention;
FIG. 10 is an exploded longitudinal sectional view of a motor-plate unit according to a preferred embodiment;
FIG. 11 is a longitudinal sectional view of the motor-plate unit from FIG. 10 as being assembled and joined to a carrousel of a labelling machine.

DETAILED DESCRIPTION OF EMBODIMENTS

With reference to the figures, a motor for a plate of a labelling machine is generally designated with the numeral 1. The motor 1 comprises a support and containment structure, i.e. a housing 2 with one or more connecting portions 3 for connecting the motor 1 to a carrousel 4 of a labelling machine (not shown). The motor 1 is preferably an electric motor with a stator 5, which is rotatably integrally fixed within the housing 2 and a rotor 6, such as a series of magnets, that is connected to a motor shaft 7. The motor shaft 7 is pivotally supported within the housing 2, due to one or more bearings 8, 9, 10 which allow the motor shaft 7 to rotate about an axis of rotation X and prevent the same to move axially and transversely relative to the axis of rotation X.

The motor 1 further comprises a coupling flange 11 with a first end 12 connected to the motor shaft 7 and a second end 13 provided with one or more seats 16 for connection to a plate 14. The motor shaft 7 and the coupling flange 11 are formed as one piece such as to form an individual shaft-flange 15 unit. This advantageously allows obviating the bulks and clearances that are necessarily linked to the prior art connection between the motor shaft and coupling flange.

According to an embodiment, the coupling flange 11 of the shaft-flange unit 15 has a substantially annular shape, particularly that of a hollow cylinder, and defines said coupling seats, particularly a plurality of threaded coupling holes 16, preferably axial relative to the axis of rotation X and suitable to house pins or coupling screws 17 for directly coupling the plate 14 to the shaft-flange unit 15. Advantageously, the coupling holes 16 are formed in the cylindrical wall of the coupling flange 11 on a circumference coaxial with the axis of rotation X of the motor shaft 7 (FIG. 1, 3).

In accordance with another embodiment (FIG. 7, 8), the coupling flange 11 has a substantially cylindrical shape and defines a threaded coupling hole 17, substantially axial and central (preferably coaxial with the axis of rotation X) and suitable to accommodate a central coupling screw 17. The coupling screw 17 is preferably in direct contact both with the plate 14 and the coupling flange 11 to provide a direct (axial and/or transversal and/or rotary integral) connection between the plate 14 and the coupling flange 11, i.e. the shaft-flange unit 15.

Advantageously, the coupling flange 11 further defines one or more secondary holes 38 suitable to accommodate secondary coupling screws 39 for fixing a plate support 43 interposed between the coupling flange 11 and the plate 14. This plate support acts as an adapter and/or support and/or spacer and/or rotational locking element between the coupling flange 11 and plate 14.

According to an embodiment, the plate support 43 is substantially disc-shaped with one or more through holes 40 (preferably, a central through hole 40) in order to allow the coupling screw 17 to be passed therethrough, and one or more further holes (41 preferably three further holes 41 arranged about the centred hole 40, which are 120°-pitch spaced from each other), which accommodate the secondary coupling screws 39.

The plate support 43 is at least partially housed in a seat of the plate 14 and advantageously covers a gap 42 formed between the coupling flange 11 and the motor housing 2. In order to prevent impurities (such as the contents of bottles or other containers broken during labelling) from entering therein, the plate support 43 comprises a circumferential gasket, such as a lip ring 44, which slides on the motor housing about the gap 42.

To allow connecting the motor 1 to the carrousel 4 of the labelling machine, the connecting portion 3 of the housing 2 of the motor defines a plurality of connecting holes, which are preferably axially arranged relative to the axis of rotation X and suitable to house corresponding connecting screws 19 that are, according to an embodiment, accommodated within holes in the carousel 4 and tightened in the connecting holes 18 of the motor. Advantageously, the connecting holes 18 are formed on the side of the motor on which the coupling flange (the motor "plate side", hereinafter) is also provided in a front surface 20 of the housing 2, which is intended to face the plate 14. In accordance with an embodiment, the connecting holes 18 are arranged on a circle concentric with the axis of rotation X having a larger diameter than the circle on which the coupling holes 16 of the coupling flange 11 are arranged.

In accordance with an embodiment, the housing 2 of motor 1 is divided into three main modules, which are separately fabricated and then joined upon assembly of the motor. The three modules comprise a base portion 21 arranged at the rotor 6 and carrying the stator 5 of the motor, said connecting portion 3, being connected to the base portion 21 on the plate side of the motor and a control portion 22 which accommodates conductors or electronic control circuits 36 of the motor and comprises one or more electrical connectors 37 that are connected to these circuits or internal conductors and suitable to receive corresponding connecting pins from the outside. The control portion 22 is connected to the base portion 21 on the side opposite the connecting portion 3 (hereinafter referred to as the motor "rear side").

As the housing 2 is divided in three modules, the base portion 21 can be manufactured in large series and combined with one of several connecting portions (according to the several types of carrousels to which the user desires to apply the motor) and one of several control portions (which are arranged and shaped according to the particular requirements of control, space and access side of the outer electrical connectors).

According to an embodiment, the connecting portion is screwed to the base portion by means of screws 34 that can be fitted within seats 35 (through holes) that are formed in the connecting portion 3. Said seats 34 are formed on the same circle on which said connecting holes 18 are formed, and are arranged alternated therewith.

In accordance to an embodiment, the motor 1 comprises a first bearing 8, which supports the shaft-flange unit within the housing in the vicinity of the coupling flange, particularly, the first bearing is splined between the coupling flange 11 of the shaft-flange unit 15 and the connecting portion 3 of the housing 2. At least one, preferably two second bearings 9, 10 is further provided to support the shaft-flange unit 15 within the housing in a position opposite the first bearing 8 relative to the rotor 6. Particularly, the second bearings 8, 9 are splined between the shaft 7 of the shaft-flange unit 15 and the base portion 21 of the housing 2.

Advantageously, at the first bearing 8, the flange-shaft unit 15 has a larger diameter than its diameter at the second bearing/s 9, 10 and, preferably, the first bearing 8 is a roller bearing whereas the second bearings comprise a second roller bearing 9 having a smaller diameter than the first roller bearing 8, and a second sliding bearing 10 having a lower diameter than the first roller bearing 8 and being arranged on the rear side of the second roller bearing 9.

In order to ensure a sufficient axial support to the motor shaft 7 (which is particularly important in the instant case, as the motor also acts as the axial support for the weight of the plate and container supported thereby), the shaft-flange unit 15 comprises a first annular abutment flange 23 which axially abuts against the first bearing 8, and a second annular abutment flange 24, which axially abuts against the second roller bearing 9 in the opposite direction to the first abutment flange 23, such as to axially lock the shaft-flange unit 15 between the two bearings 8, 9. The two bearings 8, 9 are, in turn, axially locked within the housing, due to a first abutment shoulder 25, which is axially abutted against the first bearing 8 in the opposite direction to the first abutment flange 23 of the shaft-flange unit and a second abutment shoulder 26 which axially abuts against the second bearing 9 in an opposite direction to the second abutment flange 24 of the shaft-flange unit.

In order to obtain a sufficiently high torque and a sufficiently rigid transmission for being able to directly operate the plate, the annular gap 27 between the stator 5 and rotor 6 of the motor has a larger average diameter than the diameter of the circle on which the coupling holes 16 of the coupling flange 11 have been arranged. With further advantage in terms of rigidity ad promptness of the direct motion transmission from the motor to the plate and positioning of the container to be labelled relative to a labelling station associated with the carrousel, the annular gap 27 of the motor has a lower average diameter than the diameter of the circle on which there are arranged the connecting holes 18 of the connecting portion 3 of the housing 2, and thus, of the circle on which the connection takes place between the motor and carrousel.

According to an embodiment (FIG. 1), the motor 1 defines a through opening 28, which is substantially parallel to the motor shaft and suitable to allow alignment means or other accessories gaining access to the plate or bottle bottom through the motor 1. Particularly advantageously, the shaft-flange unit 15 has a tubular shape and defines said through opening 28 therein. Due to the through opening 28, the motor 1 can be coaxially positioned and coupled relative to the plate 14, and a direct access to the bottom wall of the container to be labelled can be obtained from below for the alignment means or other accessories.

In accordance with an embodiment, the shaft-flange unit 15 is substantially tapered with steps from the coupling flange 11 to the rear side thereof, except for the shoulders or flanges at the bearings 8, 9. Advantageously, the through opening 28 is also tapered substantially in a stepped manner along the shaft-flange unit 15 from the coupling flange 11 to the rear side thereof. This implies a reduction in the polar inertia momentum of the shaft-flange unit, with the diameter being equal, and a maximum polar inertia momentum at the coupling flange 11, and thus in that point where the rotary motion is transmitted by the motor to the container to be labelled. Furthermore, the through opening 28 also has its maximum width at the coupling flange 11, such that the (usually large) active portions of the accessories or alignment means can be at least partially accommodated within the coupling flange. This entails a further reduction in the axial bulk of the motor-plate assembly.

In the embodiment illustrated for example in FIG. 1, the shaft-flange unit 15 does not extend to the rear side of the control portion 22 of the motor. However, in order to cause the alignment means or other accessories to pass through the motor to the bottle bottom, the control portion 22 defines a through channel 29 therein, which is aligned with the through opening 26 of the shaft-flange unit 15 and suitable to provide the through opening of the motor 1 together with it.

In view of the inevitable situation in which a container to be labelled is broken or however loses a part of its liquid or powder contents, the motor 1 advantageously comprises a first gasket 30 that is arranged between the housing (connecting portion 3) and the coupling flange 11 of the shaft-flange unit 15 and/or a second gasket 31 arranged between the housing (control portion 22) and the rear end of the shaft-flange unit 15 opposite the coupling flange. Advantageously, each of the gaskets 28, 29 comprises an annular lip 32 provided with an annular seat housing a clamping ring 33 (such as an O-ring) suitable to bias the annular lip 32 radially in contact with the shaft-flange unit.

FIGS. 10 and 11 show a further preferred embodiment (those components and elements which are identical and/or similar to those described with reference to the above embodiment are designated with the same numerals). In this embodiment, the shaft-flange unit 15 is also tubular and defines therein the through opening 28 that is co-axial with the axis of rotation X and preferably having a substantially even diameter throughout the length of the motor shaft 7, except for a widened portion arranged at the coupling flange 11.

The coupling flange 11 of the shaft-flange unit 15 has a substantially annular shape, particularly like a hollow cylinder, and defines the coupling seats, particularly two or more threaded coupling holes 16 axial to the axis of rotation X and suitable to house the coupling screws 17 for directly coupling the plate 14 to the shaft-flange unit 15. Advantageously, the coupling holes 16 are formed in the cylindrical wall of the coupling flange 11 on a circle coaxial with the axis of rotation X of the motor shaft 7. This embodiment does not provide secondary coupling screws dedicated only to fixing the plate support 43 to the shaft-flange unit 15. This plate support 43 is maintained in position due to the coupling screws 17. Advantageously, the plate support 43 and the plate 14 define a preferably central, through opening, which is arranged at the through opening 28 of the shaft-flange unit 15 to allow the alignment means to gain access through the motor to the bottom of the container to be labelled.

The motor for plates according to the present invention allows overcoming all the drawbacks mentioned above with reference to the prior art and has a number of further advantages.

Particularly, it has a solid and very compact structure, allows for a rigid direct transmission from the motor to the plate, a rigid connection of the motor both to the carrousel and plate and a reduction in the costs and a reduction in the manufacture, assembly, mounting and maintenance costs and time due to the fact that the motor shaft and the coupling flange are manufactured as one piece.

The motor-plate unit allows for an immediate and precise transmission of the torque and rotary motion from the motor shaft to the plate due to the plate to be directly coupled to the motor shaft by means of the coupling screw/s 17 in direct contact both with the plate and the coupling flange that is formed as one piece with the motor shaft.

Finally, the through opening through the motor shaft avoids the difficulty of placing further accessories in the vicinity of the bottle to be labelled and contributes to a further reduction in the bulk of the labelling machine.

What is claimed is:

1. A rotary labeling machine comprising a carousel supporting a plurality of motor-plate units along the periphery thereof, wherein said motor plate units are connected to said carousel, each said motor-plate unit comprising a motor and a container-holder plate suitable to support a container to be labeled, said motor comprising:
    a housing having connecting portions for connecting the motor to a carrousel of the labeling machine, the connecting portions having connecting holes;
    a stator fixed within the housing;
    a motor shaft supported for rotation within the housing;
    a rotor connected to the motor shaft; and
    a coupling flange having coupling seats for connection with the container-holder plate, wherein:
    said motor shaft and said coupling flange are formed as a single piece such as to form a single body shaft-flange unit and said coupling seats comprise a plurality of coupling holes directly formed in said single body shaft-flange unit and housing coupling screws in contact both with the shaft-flange unit and the plate to directly connect the plate to the shaft-flange unit;

an annular gap is formed between the stator and the rotor, the annular gap having a larger average diameter than the diameter of a circle on which the coupling holes of the coupling seats are arranged; and the annular gap has a smaller average diameter than the diameter of a circle on which the connecting holes of the connecting portions are arranged, wherein said motor defines a through opening to allow alignment means or other accessories of the labeling machine access to the container-holder plate through the motor.

2. The machine according to claim 1, wherein said seats comprise a threaded centered coupling hole coaxial with an axis of rotation of the motor shaft and suitable to accommodate a central coupling screw.

3. The machine according to claim 2, wherein said coupling seats comprise a plurality of coupling holes arranged on a circle coaxial with the axis of rotation of the motor shaft.

4. The machine according to claim 3, wherein said connecting portion defines a plurality of connecting holes suitable to house matching screws for connecting the motor to said carrousel.

5. The machine according to claim 4, wherein said connecting holes are arranged on a circle coaxial with the axis of rotation of the motor shaft having a larger diameter than the circle on which the coupling holes of the coupling flange are arranged.

6. The machine according to claim 1, in which said motor comprises:
   a first bearing supporting the shaft-flange unit within the housing in the vicinity of the coupling flange; and
   one or more second bearings supporting the shaft-flange unit within the housing in a position opposite the first bearing relative to said rotor.

7. The machine according to claim 6, wherein said first bearing comprises a roller bearing and said second bearings comprise a second roller bearing having a smaller diameter than the first roller bearing and a second sliding bearing having a smaller diameter than the first roller bearing and being arranged on the side of the second roller bearing opposite the first roller bearing.

8. The machine according to claim 6, wherein the shaft-flange unit comprises a first abutment flange which is axially abutted against the first bearing and a second abutment flange which is axially abutted against the second bearing in the opposite direction to the first abutment flange, and wherein the housing comprises a first abutment shoulder which is axially abutted against the first bearing in the opposite direction to the first abutment flange and a second abutment shoulder which is axially abutted against the second bearing in a direction opposite the second abutment flange, such as to axially lock the shaft-flange unit relative to the housing.

9. The machine according to claim 1, wherein, at the first bearing, said shaft-flange unit has a larger diameter than its diameter at the at least one second bearing.

10. The machine according to claim 1, wherein said shaft-flange unit has a tubular shape and defines said through opening therein.

11. The machine according to claim 1, wherein said shaft-flange unit is tapered substantially with steps from the coupling flange to an opposite side thereof, except for shoulders or flanges provided at the bearings.

12. The machine according to claim 1, wherein said through opening is tapered substantially with steps along the shaft-flange unit from the coupling flange to an opposite side thereof and defines an enlarged portion at the coupling flange.

13. The machine according to claim 1, wherein said housing comprises:
   a base portion carrying said stator;
   said connecting portion being fabricated distinct from the base portion and subsequently connected thereto on the coupling flange side;
   a control portion accommodating electronic control circuits for the motor and comprising one or more electrical connectors that are connected to the circuits and suitable to receive connecting pins from the outside, said control portion being fabricated distinct from the base portion and subsequently connected thereto on the side opposite the coupling flange.

14. The machine according to claim 13, wherein the shaft-flange unit has a through opening and said control portion defines a through channel therein, which is aligned with the through opening of the shaft-flange unit.

15. The machine according to claim 1, comprising a plate support interposed between the shaft-flange unit and the container-holder plate and providing fitting and/or antirotational locking means.

* * * * *